US008062792B2

(12) United States Patent
Kang et al.

(10) Patent No.: US 8,062,792 B2
(45) Date of Patent: Nov. 22, 2011

(54) PROCESSES FOR MAKING DENSE, SPHERICAL ACTIVE MATERIALS FOR LITHIUM-ION CELLS

(75) Inventors: Sun-Ho Kang, Naperville, IL (US); Khalil Amine, Downers Grove, IL (US)

(73) Assignee: UChicago Argonne LLC, Chicago, IL (US)

( * ) Notice: Subject to any disclaimer, the term of this patent is extended or adjusted under 35 U.S.C. 154(b) by 1078 days.

(21) Appl. No.: 11/410,757

(22) Filed: Apr. 25, 2006

(65) Prior Publication Data

US 2006/0239883 A1   Oct. 26, 2006

Related U.S. Application Data

(60) Provisional application No. 60/674,894, filed on Apr. 26, 2005.

(51) Int. Cl.
*H01M 4/13* (2010.01)
*H01M 4/58* (2010.01)
*C01B 25/12* (2006.01)
*C01B 31/24* (2006.01)

(52) U.S. Cl. ............... 429/231.1; 429/231.95; 423/304; 423/419.1; 423/594.17; 423/594.8

(58) Field of Classification Search ............... 429/231.1, 429/231.95; 423/304
See application file for complete search history.

(56) References Cited

U.S. PATENT DOCUMENTS

| 4,513,143 | A | | 4/1985 | Ng et al. |
| 4,857,423 | A | | 8/1989 | Abraham et al. |
| 5,186,727 | A | * | 2/1993 | Chang .......................... 95/117 |
| 5,487,959 | A | | 1/1996 | Koksbang |
| 5,709,968 | A | | 1/1998 | Shimizu |
| 5,731,106 | A | | 3/1998 | Tsutsumi et al. |
| 5,763,119 | A | | 6/1998 | Adachi |
| 5,824,434 | A | | 10/1998 | Kawakami et al. |
| 5,858,573 | A | | 1/1999 | Abraham et al. |
| 6,004,698 | A | | 12/1999 | Richardson et al. |
| 6,040,087 | A | * | 3/2000 | Kawakami ................ 429/218.1 |
| 6,045,952 | A | | 4/2000 | Kerr et al. |
| 6,074,777 | A | | 6/2000 | Reimers et al. |
| 6,207,326 | B1 | | 3/2001 | Kawakami et al. |

(Continued)

OTHER PUBLICATIONS

Yoshio, M. et al., "Storage and cycling performance of Cr-modified spinel at elevated temperatures," *Journal of Power Sources*, vol. 101, pp. 79-85, Aug. 29, 2001; published by Elsevier Science B.V.

(Continued)

*Primary Examiner* — Karie O'Neill Apicella
(74) *Attorney, Agent, or Firm* — Foley & Lardner LLP

(57) ABSTRACT

Processes are provided for making dense, spherical mixed-metal carbonate or phosphate precursors that are particularly well suited for the production of active materials for electrochemical devices such as lithium ion secondary batteries. Exemplified methods include precipitating dense, spherical particles of metal carbonates or metal phosphates from a combined aqueous solution using a precipitating agent such as ammonium hydrogen carbonate, sodium hydrogen carbonate, or a mixture that includes sodium hydrogen carbonate. Other exemplified methods include precipitating dense, spherical particles of metal phosphates using a precipitating agent such as ammonium hydrogen phosphate, ammonium dihydrogen phosphate, sodium phosphate, sodium hydrogen phosphate, sodium dihydrogen phosphate, or a mixture of any two or more thereof. Further provided are compositions of and methods of making dense, spherical metal oxides and metal phosphates using the dense, spherical metal precursors. Still further provided are electrodes and batteries using the same.

22 Claims, 13 Drawing Sheets

U.S. PATENT DOCUMENTS

| | | | |
|---|---|---|---|
| 6,291,107 | B1 | 9/2001 | Shimizu |
| 6,387,571 | B1 | 5/2002 | Lain et al. |
| 6,395,423 | B1 | 5/2002 | Kawakami et al. |
| 6,506,516 | B1 | 1/2003 | Wietelmann et al. |
| 6,780,545 | B2 | 8/2004 | Birke-Salam et al. |
| 6,949,233 | B2* | 9/2005 | Kweon et al. ............... 423/179.5 |
| 2002/0086209 | A1* | 7/2002 | Takeuchi et al. ............... 429/219 |
| 2003/0091892 | A1 | 5/2003 | Watanabe et al. |
| 2003/0118912 | A1 | 6/2003 | Watanabe et al. |
| 2003/0190529 | A1 | 10/2003 | Kim et al. |
| 2004/0013944 | A1 | 1/2004 | Lee et al. |
| 2004/0028996 | A1 | 2/2004 | Hamamoto et al. |
| 2004/0029017 | A1 | 2/2004 | Besenhard et al. |
| 2004/0121239 | A1 | 6/2004 | Abe et al. |
| 2004/0151649 | A1* | 8/2004 | Hemmer et al. ............... 423/306 |
| 2004/0157126 | A1 | 8/2004 | Belharouak et al. |
| 2004/0191633 | A1 | 9/2004 | Johnson et al. |
| 2004/0214091 | A1 | 10/2004 | Lim et al. |
| 2005/0019670 | A1 | 1/2005 | Amine et al. |
| 2005/0058588 | A1 | 3/2005 | Kang et al. |
| 2005/0069774 | A1* | 3/2005 | Miyazaki et al. ........... 429/231.3 |
| 2005/0106470 | A1 | 5/2005 | Yoon et al. |
| 2005/0227143 | A1 | 10/2005 | Amine et al. |

OTHER PUBLICATIONS

Ravet, N. et al., "Electroactivity of natural and synthetic triphylite," *Journal of Power Sources*, vols. 97-98, pp. 503-507, Jul. 3, 2001; published by Elsevier Science B.V.

Davidson, I. J. et al., "Rechargeable cathodes based on $Li_2CR_x Mn_{2-x}O_4$," *Journal of Power Sources*, vol. 54, pp. 205-208, 1995; published by Elsevier Science B.V.

Andersson, A. S. et al., "Lithium extraction/insertion in $LiFePO_4$: an X-ray diffraction and Mössbauer spectroscopy study," *Solid State Ionics*, vol. 130, pp. 41-52, Apr. 28, 2000; published by Elsevier Science B.V.

Xu, K. et al., "Lithium Bis(oxalate)borate Stabilizes Graphite Anode in Propylene Carbonate," *Electrochemical and Solid-State Letters*, vol. 5, No. 11, pp. A259-A262, 2002; published by The Electrochemical Society, Inc. Available electronically Sep. 10, 2002.

Kannan, A. M. et al., "Surface/Chemically Modified $LiMn_2O_4$ Cathodes for Lithium-Ion Batteries," *Electrochemical and Solid-State Letters*, vol. 5, No. 7, pp. A167-A169, 2002; published by The Electrochemical Society, Inc. Available electronically May 3, 2002.

Huang, H. et al., "Approaching Theoretical Capacity of $LiFePO_4$ at Room Temperature at High Rates," *Electrochemical and Solid-State Letters*, vol. 4, No. 10, pp. A170-A172, 2001; published by The Electrochemical Society, Inc. Available electronically Aug. 20, 2001.

Blyr, A. et al., "Self-Discharge of $LiMn_2O_4$/C Li-Ion Cells in Their Discharged State," vol. 145, No. 1, pp. 194-209, Jan. 1998; published by The Electrochemical Society, Inc.

Chen, Z. et al., "Reducing Carbon in $LiFePO_4$/C Composite Electrodes to Maximize Specific Energy, Volumetric Energy, and Tap Density," *J. Electrochem. Soc.*, vol. 149, No. 9, pp. A1184-A1189, 2002; published by The Electrochemical Society, Inc. Available electronically Jul. 29, 2002.

Yamada, A. et al., "Optimized $LiFePO_4$ for Lithium Battery Cathodes," *J. Electrochem. Soc.*, vol. 148, No. 3, pp. A224-A229, 2001; published by The Electrochemical Society, Inc.

Franger, S. el al., "Optimized Lithium Iron Phosphate for High-Rate Electrochemical Applications," *J. Electrochem. Soc.*, vol. 151, vol. 7, pp. A1024-A1027, 2004; published by The Electrochemical Society, Inc. Available electronically May 27, 2004.

Chung, S.-Y. et al., "Electronically conductive phospho-olivines as lithium storage electrodes," *Nature Materials*, vol. 1, pp. 123-128, Oct. 2002; published by Nature Publishing Group. Published online Sep. 22, 2002.

Padhi, A. K. et al., "Phospho-olivines as Positive-Electrode Materials for Rechargeable Lithium Batteries," *J. Electrochem. Soc.*, vol. 144, No. 4, Apr. 1997; published by The Electrochemical Society, Inc.

Amatucci, G. G. et al., "Failure Mechanism and Improvement of the Elevated Temperature Cycling of $LiMn_2O_4$ Compounds Through the Use of the $LiAl_xMn_{2-x}O_{4-z}F_z$ Solid Solution," *J. Electrochem. Soc.*, vol. 148, No. 2, pp. A171-A182, 2001; published by The Electrochemical Society, Inc.

Sigala, C. et al., "Influence of the Cr Content on the Electrochemical Behavior of the $LiCr_yMn_{2-y}O_4$ ($0 \leq y \leq 1$) Compounds," *J. Electrochem. Soc.*, vol. 148, No. 8, pp. A826-A832, 2001; published by The Electrochemical Society, Inc. Available electronically Jun. 25, 2001.

Kellomäki, M. et al., "Processing and properties of two different poly (ortho esters)," *Journal of Materials Science; Materials in Medicine*, vol. 11, pp. 345-355, 2000; published by Kluwer Academic Publishers.

Lee, H. S. et al., "Synthesis of a Series of Fluorinated Boronate Compounds and Their Use as Additives in Lithium Battery Electrolytes," *J. Electrochem. Soc.*, vol. 151, No. 9, pp. A1429-A1435, 2004; published by The Electrochemical Society, Inc.

Chen, J. et al., "Chemical Overcharge and Overdischarge Protection for Lithium-Ion Batteries," *Electrochemical and Solid-State Letters*, vol. 8, No. 1, pp. A59-A62, 2005; published by The Electrochemical Society, Inc.

Komaba, S. et al., "2-Vinylpyridine as Film-forming Additve [sic] to Suppress the Degradation of Carbon Anode by Dissolved Manganese for E/LiMn2O4 Rechargable Battery," Chemistry Letters, 2002, No. 12, pp. 1236-1237; published by The Chemical Society of Japan.

Ying, J. et al., "Preparation and characterization of high-density spherical $LiNi_{0.8}Co_{0.2}O_2$ cathode material for lithium secondary batteries," *Journal of Power Sources*, vol. 99, pp. 78-84, 2001; published by Elsevier Science B.V.

Lee, M.-H. et al., "Synthetic optimization of $Li[Ni_{1/3}Co_{1/3}Mn_{1/3}]O_2$ via co-precipitation," *Electrochimica Acta*, vol. 50, pp. 939-948, 2004; published by Elsevier Ltd.

Lee, Y. S. et al., "Preparation and characterization of nano-crystalline $LiNi_{0.5}Mn_{1.5}O_4$ for 5 V cathode material by composite carbonate process," *Electrochemistry Communications*, vol. 4, pp. 989-994, 2002; published by Elsevier Science B.V.

Park, K. S. et al., "Synthesis of $LiFePO_4$ with fine particle by coprecipitation method," *Materials Research Bulletin*, vol. 39, pp. 1803-1810, 2004; published by Elsevier Ltd.

Park, S.-M. et al., "Novel Synthesis Method for Preparing Layered $Li[Mn_{1/2}Ni_{1/2}]O_2$ as a Cathode Material for Lithium Ion Secondary Battery," *Chemistry Letters*, vol. 33, No. 6, pp. 748-749, 2004; published by The Chemical Society of Japan.

Park, S.-H. et al., "Synthesis of Nanostructured $Li[Ni_{1/3}Co_{1/3}Mn_{1/3}]O_2$ via a Modified Carbonate Process," *Chem. Mater.*, vol. 17, pp. 608, 2005; published by American Chemical Society.

Cho, Tae-hyung et al., "Preparation of Layered $Li[Ni_{1/3}Mn_{1/3}Co_{1/3}]O_2$ as a Cathode for Lithium Secondary Battery by Carbonate Coprecipitation Method," *Chemistry Letters*, vol. 33, No. 6, pp. 704-705, 2004; published in The Chemical Society of Japan.

\* cited by examiner

PROCESSES FOR MAKING DENSE, SPHERICAL ACTIVE MATERIALS FOR LITHIUM-ION CELLS

CROSS-REFERENCES TO RELATED APPLICATIONS

This application claims priority to U.S. Provisional Patent No. 60/674,894, filed Apr. 26, 2005, the contents of which is incorporated herein by reference in its entirety and for all purposes as if fully set forth herein.

GOVERNMENT RIGHTS

The United States Government has rights in this invention pursuant to Contract No. W-31-109-ENG-38 between the United States Department of Energy and the University of Chicago representing Argonne National Laboratory.

FIELD OF THE INVENTION

The invention relates to processes for making active materials for use in electrochemical devices. In particular, the invention relates to methods of preparing dense spherical precursors and active materials for use in electrodes of lithium ion cells, and electrodes and batteries made from such materials.

BACKGROUND OF THE INVENTION

Lithium-ion secondary batteries are widely used as rechargeable power sources for many applications such as consumer electronics, electric vehicles, hybrid electric vehicles (HEVs), satellites, spaceships, medical devices, and power tools. For such applications, Li-ion secondary batteries exhibiting higher energy densities and better thermal safety are desired when compared to those Li-ion cells that are currently available.

In general, the energy density and thermal safety of a Li-ion cell depends on the cathode material used in the cell. To increase the energy density of a Li-ion cell, it is necessary to develop cathode materials which have a high practical capacity and high material density to increase gravimetric and volumetric capacity, respectively. Cathode-related thermal safety problems may be caused by reactions between cathode particle surfaces and the organic electrolytes in charged states. Therefore, to improve the thermal safety of Li-ion cells, cathode materials must be developed with inherent thermal safety and/or which have a surface area that is as small as possible. Also, cathode materials with smooth surface morphologies can enhance the thermal safety characteristics of the cells. Improved safety results from smooth surfaces because the reactivity of materials with an organic electrolyte is very high at sharp edges due to very high chemical activity of ions at interfaces with high curvature.

In general, the morphology of calcined metal oxides is determined by the starting metal precursors and the synthetic methods employed. Both of these considerations also play an important role in controlling the electrochemical properties of the cathode materials in Li-ion cells. Co-precipitation of mixed metal hydroxides is the most widely adopted process to prepare dense, spherical metal precursors. However, co-precipitation of mixed metal hydroxides requires careful control of certain experimental parameters, such as pH and atmosphere. Such control is especially important when the mixed metal hydroxides contain manganese, due to the instability of $Mn(OH)_2$. (J. Ying et al., J. Power Sources, 99, 78 (2001); M. H. Lee et al., Electrochim. Acta, 50, 939 (2004)). When manganese is used as one of the major constituents of the co-precipitated hydroxides, the co-precipitated hydroxide particles do not form dense, spherical shapes. However, since manganese-based cathode materials are promising for other reasons, methods of making dense spherical manganese oxides are highly desirable. More generally, there is a need in the art for inexpensive and operatively simple methods of forming dense spherical particles of active materials for lithium ion cells.

SUMMARY

The present invention provides, in part, processes for making dense, spherical mixed metal carbonate or phosphate precursors particularly well suited to the production of active materials for lithium ion cells, such as lithium ion secondary batteries. It has been unexpectedly discovered that the co-precipitation of mixed metal carbonates or phosphates provides dense spherical particles with the exact formulation necessary to prepare lithium metal oxides, phosphates, and other metal oxides used for cathodes in various types of batteries. In addition to the high stability of manganese carbonate precursors, carbonate precipitation has many other advantages over hydroxide precipitation. For example, carbonate precipitation is a cheaper process and occurs at lower pH (from about pH 4 to about pH 8) than hydroxide precipitation (pH>12). Furthermore, precipitated carbonate powders are easier to handle in air, because they are less hygroscopic than precipitated hydroxide powders.

Compositions and methods of making dense, spherical metal oxides and metal phosphates using the dense, spherical metal precursors are also provided. In another aspect, the invention provides electrodes and batteries using such dense, spherical metal oxides and phosphates.

DETAILED DESCRIPTION

Figure 1:
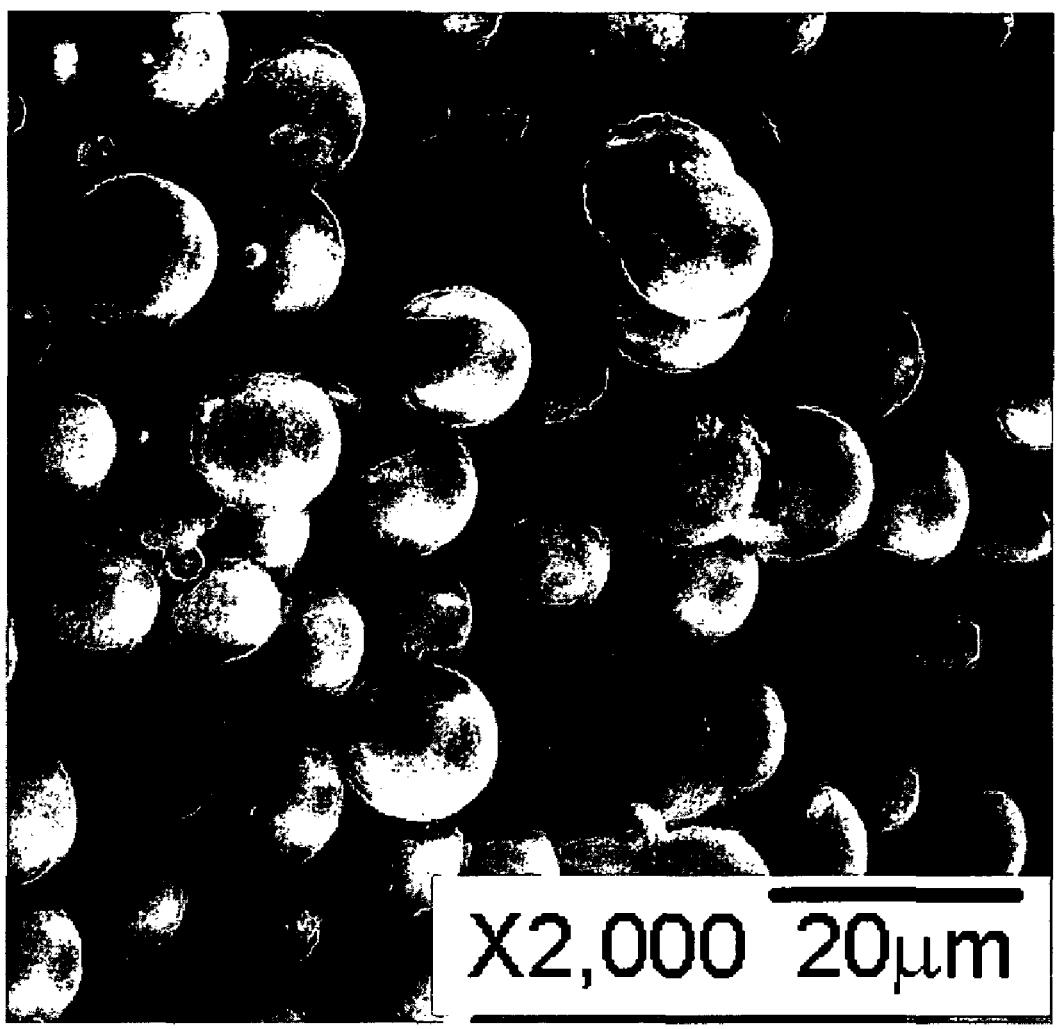
FIG. 1 is an SEM (scanning electron microscopy) image (×2,000) of $(Ni,Co,Mn)CO_3$, prepared from a solution of 0.1 M $Ni(OCOCH_3)_2$, 0.1 M $Co(NO_3)_2$, 0.1 M $Mn(OCOCH_3)_2$, and 1 M of $NH_4HCO_3$ at 65° C. over 17 hours.

The present invention generally relates to new methods for the preparation of precursors for active materials, and for the use of such active materials in electrodes for lithium ion cells. In accordance with one aspect, there are provided methods for making dense, spherical metal carbonates and metal phosphates. In some embodiments, the methods include precipitating spherical particles comprising one or more metal carbonates or one or more metal phosphates from a combined aqueous solution comprising a precipitating agent. In other embodiments, the methods include precipitating spherical particles comprising two or more metal carbonates or two or more metal phosphates from a combined aqueous solution comprising a precipitating agent. In some embodiments, methods further comprise calcining the spherical particles from about 100° C. to about 1000° C. or from about 400° C. to about 1000° C. As used herein, calcining refers to heating at a designated temperature(s) in either an inert atmosphere or in air. Where the spherical particles comprise metal carbonates, the precipitating agent may be, but is not limited to, sodium hydrogen carbonate, or a mixture that comprises sodium hydrogen carbonate. Such a mixture may include sodium hydrogen carbonate and ammonium hydrogen carbonate, or sodium hydrogen carbonate, ammonium hydrogen carbonate and sodium carbonate. Where the spherical particles comprise metal phosphate(s), the precipitating agent may be, but is not limited to, ammonium hydrogen phosphate, ammonium dihydrogen phosphate, sodium phosphate, sodium hydrogen phosphate, sodium dihydrogen phosphate, or a mixture comprising any two or more thereof. Spherical particles, as understood by those skilled in the art, are round particles that are generally sphere-shaped when observed at the micrometer level. Use of the term "spherical" does not mean that every particle is a perfect sphere, merely that a majority of the particles are not rough and irregular in shape at the micron level.

In some embodiments, the precipitation is carried out by adding an aqueous solution of one or more metal salts to an aqueous solution comprising the precipitating agent to form the combined solution. Generally, suitable metal salts for use in inventive methods, include metal sulfates, metal acetates, metal nitrates, metal chlorides, and mixtures of any two or more thereof. Exemplary metal salts include, but are not limited to, those of Ni, Co, Mn, Fe, Ag, Cu, Zn, and Mg. Typically, the total concentration of metal ions in the aqueous solution of the metal salts ranges from about 0.01 M to about 5 M. In some embodiments, the total concentration of metal ions in the aqueous solution of metal salts ranges from about 0.05 or 0.1 M to about 1, 2, or 3 M. The pH of the aqueous metal salt solution may adjusted to be from about 4 to about 8. The total concentration of precipitating agent is typically in the range of about 0.05 M to about 5 M and can be about 0.1 or 0.2 M to about 2 or 3 M. The combined solution is kept at a constant temperature in the range of about 20° C. to about 100° C. during the precipitation process and is generally stirred at a speed in the range of 250 rpm to 1500 rpm. Atmospheric make-up can affect particle purity in some instances. For example, where the spherical metal particles are iron phosphates, the combined solution is purged with a gas such as air or oxygen during the precipitation process to provide a pure $FePO_4$ precursor.

In other embodiments, the precipitation of dense, spherical metal carbonates and metal phosphates is carried out in the presence of a chelating agent such as ammonium sulfate, ammonium hydroxide, ammonium chloride, ammonium acetate, ammonium nitrate, urea, or a mixture of any two or more thereof. Typically, the total concentration of chelating agent ranges from about 0.005 M to about 2 M.

Methods of the invention provide active materials having superior morphology and well-defined compositions for use in lithium ion cells. Other, known methods of preparing active materials can result in irregularly shaped particles that have undesirably sharp edges and high surface areas (see FIG. 2). The chemical composition of the particles can also be difficult to control in such known methods. In contrast, precipitated particles that result from the disclosed methods tend to be very spherical, dense, and of well-defined composition (see, e.g., FIGS. 1, 3, 4, and 5). Thus, in another aspect, compositions are provided that may be prepared by any of the methods described herein. In particular, there are provided compositions comprising spherical particles of metal carbonates or metal phosphates having a diameter of from about 0.1 μm to about 100 μm and an average tap density of from about 1.5 g/cm³ to about 3 g/cm³ in some embodiments, or from about 1.8 g/cm³ to about 2.5 g/cm³ in other embodiments. Tap density is typically measured by placing a known mass of a powder in a mass cylinder at may be attached to a tap-density meter. The tap density-meter then taps the mass cylinder about 1600 times. After tapping is finished, the volume of the powder is determined and the tap density (g/ml) is calculated from the weight and volume of the powder. Tap density meters such as the AUTOTAP™ are commercially available from sources such as Quantachrome Instruments in Boynton Beach, Fla. The composition of particles of metal carbonates provided by the above methods may include, for example, $Ag_2CO_3$ or $(Ni_\alpha CO_\beta Mn_\gamma Me'_\delta)CO_3$, wherein Me' is Fe, Ag, Cu, Zn, or Mg; and $0 \leq \alpha \leq 1$, $0 \leq \beta \leq 1$, $0 \leq \gamma \leq 1$, and $0 \leq \delta \leq 1$ and where the sum of $\alpha$, $\beta$, $\gamma$, and $\delta$ is 1. In other embodiments, methods are provided for preparing dense, spherical particles of metal phosphates having, for example, the formula $(Ni_{\alpha'}CO_{\beta'}Mn_{\gamma'}Fe_\delta)PO_4$, wherein $0 \leq \alpha' \leq 1$, $0 \leq \beta' \leq 1$, $0 \leq \gamma' \leq 1$, and $0 \leq \delta \leq 1$ and where the sum of $\alpha'$, $\beta'$, $\gamma'$, and $\delta$ is 1. The methods also provide dense, round particles of nickel-cobalt-manganese carbonates, such as $(Ni_{1/3}Co_{1/3}Mn_{1/3})CO_3$, and iron phosphates, such as $FePO_4$.

In another aspect, there are provided spherical lithium metal oxides and phosphates using the precursor materials described herein and methods of making the same. In some embodiments for preparing lithium metal oxides or phosphates using the precipitated carbonate or phosphate precursors, the mixing of lithium salt and metal carbonates or phosphates is carried out in a manner that will not destroy the spherical shape of the metal carbonates or phosphates. In some embodiments, methods are provided comprising calcining a mixture of a lithium salt and a mixture of spherical particles embodied herein to provide spherical lithium particles selected from, but not limited to spherical lithium metal oxides or spherical lithium metal phosphates. Lithium metal salts suitable for this purpose include, but are not limited to, lithium carbonate, lithium hydroxide, lithium nitrate, lithium acetate, or a mixture of any two or more thereof. In some embodiments, the mixture to be calcined also includes a metal cation dopant such as a metal oxide, metal hydroxide, metal acetate, metal nitrate, or a mixture of two or more thereof. In some embodiments, the metal of the cation dopant may be, but is not limited to Mg, Zn, Al, Ga, B, Zr, Si, Ti, Nb, W, or a mixture of any two or more thereof. In other embodiments, the mixture to be calcined further includes a material that provides an anion dopant such as F, S, Cl, Br, I, or a mixture of any two or more thereof. In some embodiments, the mixture is calcined by heating at about 400° C. to about 1,000° C. in either an inert atmosphere or in the presence of oxygen, such as in air. An inert atmosphere is typically used in the preparation of dense, spherical lithium iron phosphates.

In some embodiments, the spherical lithium metal oxide includes, but is not limited to $Li_{1+x}Ni_\alpha CO_\beta Mn_\gamma Me_y O_{2-z} X_z$ wherein Me is Mg, Zn, Al, Ga, B, Zr, Si, Ti, Nb, or W; X is F, S, Cl, or I; $0 \leq x \leq 0.33$, $0 \leq \alpha \leq 1$, $0 \leq \beta \leq 1$, $0 \leq \gamma \leq 1$, $0 \leq y \leq 0.2$, and $0 \leq z \leq 0.3$; and where the sum of x, $\alpha$, $\beta$, $\gamma$, and y is equal to 1. In some embodiments, the spherical lithium metal oxide is a spinel comprising $Li_{1+x}Ni_a CO_b Mn_c Me_y O_{4-z} X_z$ wherein Me is Mg, Zn, Al, Ga, B, Zr, Si, Ti, Nb, or W; X is F, S, Cl, or I; $0 \leq x \leq 0.33$, $0 \leq a \leq 2$, $0 \leq b \leq 2$, $0 \leq c \leq 2$, $0 \leq y \leq 0.2$, and $0 \leq z \leq 0.3$; and where the sum of x, a, b, c, and y is equal to 2. In yet other embodiments, the spherical lithium metal phosphate includes, but is not limited to $Li_{1+x}(Ni_{\alpha'}Co_{\beta'}Mn_{\gamma'}Fe_\delta)_{1-y'}Me''_{y'}PO_4$ wherein Me'' is selected from the group consisting of Al, Zr, Si, Ti, Nb, Mo, and W; $0 \leq x' \leq 0.1$; $0 \leq \alpha' \leq 1$, $0 \leq \beta' \leq 1$, $0 \leq \gamma' \leq 1$, and $0 \leq y' \leq 0.1$ In other embodiments, methods of preparing metal oxides include calcining a mixture of a vanadium oxide and a spherical metal carbonate comprising silver, to provide a spherical silver vanadium oxide. In some embodiments, the composition comprising silver is silver carbonate and the vanadium oxide is vanadium pentoxide or ammonium metavanadate. As above, the mixture is calcined by heating the mixture at about 400° C. to about 1,000° C. In some embodiments, the spherical silver vanadium oxide has the formula $Ag_2V_4O_{11}$.

In another aspect, embodiments provide electrodes comprising the spherical lithium metal oxides and lithium metal phosphates described herein. Typically, the electrodes made from the disclosed materials are cathodes for use in an electrochemical device. Thus, some embodiments provide an electrochemical device comprising: a cathode; an anode; and a non-aqueous electrolyte. The non-aqueous electrolyte may be any conventional or otherwise suitable organic electrolyte known in the art. For example, non-aqueous electrolytes disclosed in co-pending U.S. patent application Ser. Nos. 10/857,365; 11/338,902; 11/297,120, and 11/366,891, and in U.S. Provisional Application No. 60/662,056, are particularly well-suited for use in the present invention. In some embodiments, the electrochemical device is a lithium secondary battery; the cathode is a lithium metal oxide or a lithium metal phosphate cathode; the anode is a carbon or lithium metal anode; and the anode and cathode are separated from each other by a porous separator. The anode may comprise graphite, amorphous carbon, $Li_4Ti_5O_{12}$, tin alloys, silicon alloys, intermetallic compounds, lithium metal, or mixtures of any two or more thereof. Suitable graphitic materials may include, but are not limited to, natural graphite, artificial graphite, graphitized meso-carbon microbeads, graphite fibers, or a mixture of any two or more thereof, as well as any amorphous carbon materials.

One skilled in the art will readily realize that all ranges discussed can and do necessarily also describe all subranges therein for all purposes and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present invention, thus generally described, will be understood more readily by reference to the following examples, which are provided by way of illustration and are not intended to be limiting of the present invention.

EXAMPLES

General Procedures

Dense, spherical $(Ni,Mn,Co,Me')CO_3$, is generally prepared by co-precipitation as follows: an appropriate amount of $NiSO_4$ (alternatively, $Ni(OCOCH_3)_2$, $Ni(NO_3)_2$, $NiCl_2$, a mixture any two or more thereof, or a mixture of any one or more with $NiSO_4$ may be used), $MnSO_4$ (alternatively, $Mn(OCOCH_3)_2$, $Mn(NO_3)_2$, $MnCl_2$, a mixture any two or more thereof, or a mixture of any one or more with $MnSO_4$ may be used), $CoSO_4$ (alternatively, $Co(OCOCH_3)_2$, $Co(NO_3)_2$, $CoCl_2$, a mixture any two or more thereof, or a mixture of any one or more with $CoSO_4$ may be used), and $Me'_m(SO_4)_n$ (alternatively, $Me'_m(OCOCH_3)_n$, $Me'_m(NO_3)_n$, $Me'_mCl_n$, a mixture any two or more thereof, or a mixture of any one or more with $Me'_m(SO_4)_n$ may be used; wherein Me' is selected from Fe, Ag, Cu, Zn, or Mg; and m=1 or 2, and n=1, 2, or 3) is dissolved in distilled water. The total concentration of the metal ions may vary from 0.1 M to 1 M. An appropriate amount of $(NH_4)_2SO_4$ (alternatively $NH_4OH$, $NH_4Cl$, $NH_4(OCOCH_3)$, $NH_4NO_3$, urea, a mixture any two or more thereof, or a mixture of any one or more with $(NH_4)_2SO_4$ may be used) is added as a chelating agent, with the total concentration of the chelating agent(s), varying from 0.063 M to 0.1 M. An appropriate amount of $NH_4OH$ or NaOH is added to the metal solutions to control the pH of the metal solution from about 4 to 8. The mixed metal solution is then added to a solution of precipitating agents comprising $NaHCO_3$, $NH_4HCO_3$, or a mixture thereof with the total concentration of the precipitating agents varied from 0.5 M to 1 M. During the co-precipitation process the overall solution is stirred at a speed of about 250 to about 1500 rpm, and kept at a constant temperature in the range of 20° C. to 100° C. The co-precipitated powder is washed, filtered, and dried at from about 25° C. to about 120° C.

To prepare lithium metal oxides, $Li_2CO_3$, LiOH, Li(O-$COCH_3$), $LiNO_3$, or a mixture of any two or more thereof, and (Ni,Co,Mn,Me')$CO_3$ is mixed in a manner so as to not destroy the spherical morphology of the metal carbonates. The mixed powder is then calcined from 400 to 1,000° C. for 6 to 30 hours in an air, oxygen, or inert atmosphere. During the calcining process, slow heating (heating rate $\leq$2° C./min) is preferred so that decomposition of (Ni,Co,Mn,Me')$CO_3$ takes place slowly. Similar processes could also be used to prepare an olivine such as $LiFePO_4$, a silver vanadium oxide ($Ag_2V_4O_{11}$), or other lithium metal oxide active materials that are used in lithium secondary and primary batteries.

Lithium metal oxides, silver vanadium oxide, or lithium iron phosphates thus prepared, are then mixed with carbon additives and polyvinylidene fluoride (PVDF) binder to form a laminate film on aluminum foil. This laminate was then used for electrochemical testing in the presence of a lithium or carbon counter electrode in a non-aqueous electrolyte prepared from a solution of $LiPF_6$ in a 1:1 mixture of ethylene carbonate (EC) and diethylene carbonate (DEC).

Example 1

A (Ni,Co,Mn)$CO_3$ compound was prepared from a solution of 0.1 M each of Ni(OCOCH$_3$)$_2$, Co(NO$_3$)$_2$, Mn(OCOCH$_3$)$_2$, and 1 M $NH_4HCO_3$. The solution was prepared at 65° C. over 17 h, and the targeted composition was ($Ni_{1/3}Co_{1/3}Mn_{1/3}$)$CO_3$. FIG. 1 is an image of the prepared (Ni,Co,Mn)$CO_3$ sample as recorded using SEM. The SEM image of the precipitated carbonate shows a dense and spherical morphology with average particle size of approximately 4-5 μm. The elemental analysis revealed that the composition of the carbonate was ($Ni_{0.255}Co_{0.362}Mn_{0.383}$)$CO_3$, which, presumably, was due to strong Ni—$NH_3$ complex in the solution leading to partial precipitation of the Ni component. Incomplete precipitation of Ni was also confirmed by the observation of a blue color of the filtered solution. Blue is indicative of the presence of Ni—$NH_3$ complexes.

Comparative Example 1

Figure 2:
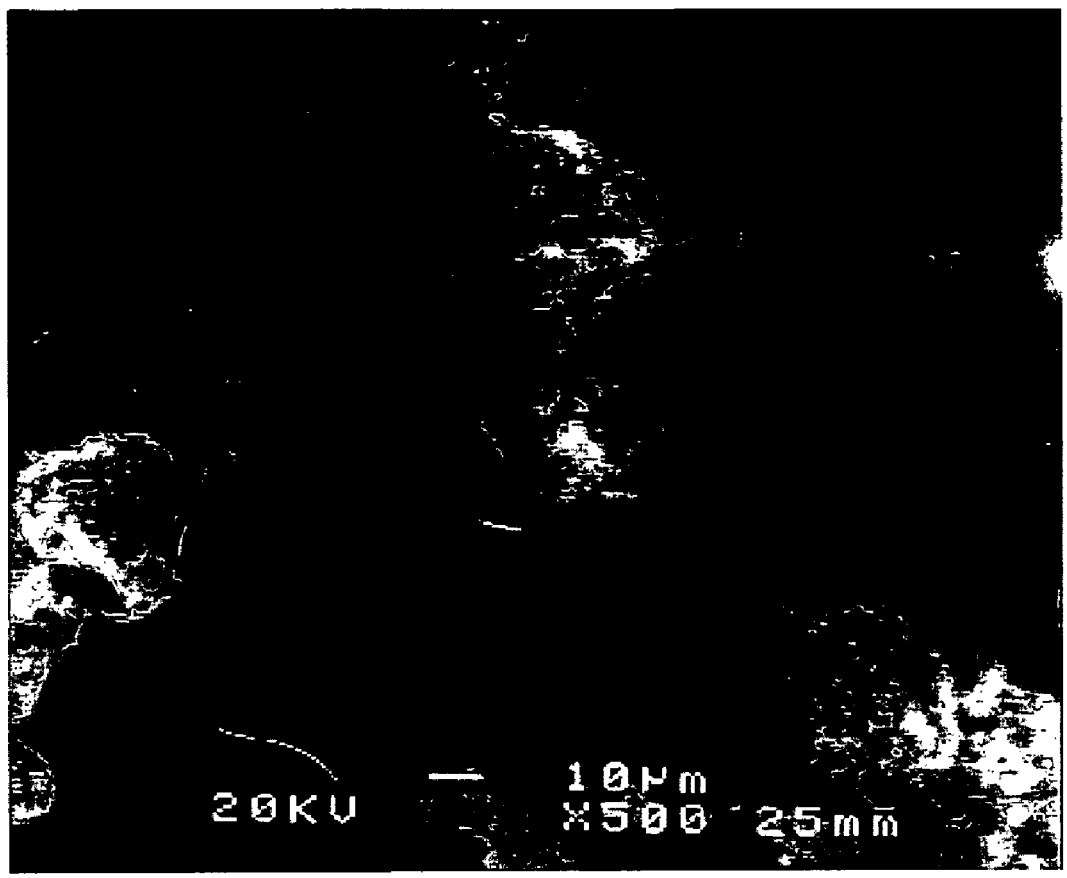
FIG. 2 (Comparative Example) is an SEM image (×500) of $(Ni_{1/3}Co_{1/3}Mn_{1/3})CO_3$, prepared from a solution of 0.2 M of $NiSO_4$, 0.2 M $CoSO_4$, 0.2 M $MnSO_4$, and 1 M of $Na_2CO_3$, using $(NH_4)_2SO_4$ (0.067 M) as a chelating agent at a temperature of 50° C. over 17 h.

A of ($Ni_{1/3}Co_{1/3}Mn_{1/3}$)$CO_3$ was prepared from a solution of 0.2 M of $NiSO_4$, 0.2 M $CoSO_4$, 0.2 M $MnSO_4$, and 1 M of $Na_2CO_3$, with ($NH_4$)$_2SO_4$ (0.067 M) used as a chelating agent at 50° C. and over 17 h. FIG. 2 shows an SEM image of ($Ni_{1/3}Co_{1/3}Mn_{1/3}$)$CO_3$. The chemical composition of the ($Ni_{1/3}Co_{1/3}Mn_{1/3}$)$CO_3$ was confirmed by elemental analysis. The filtered solution was colorless, indicating complete precipitation of all the metal ions. However, the co-precipitated powder showed irregular shape and agglomerates of very fine particles.

Example 2

Figure 3A:
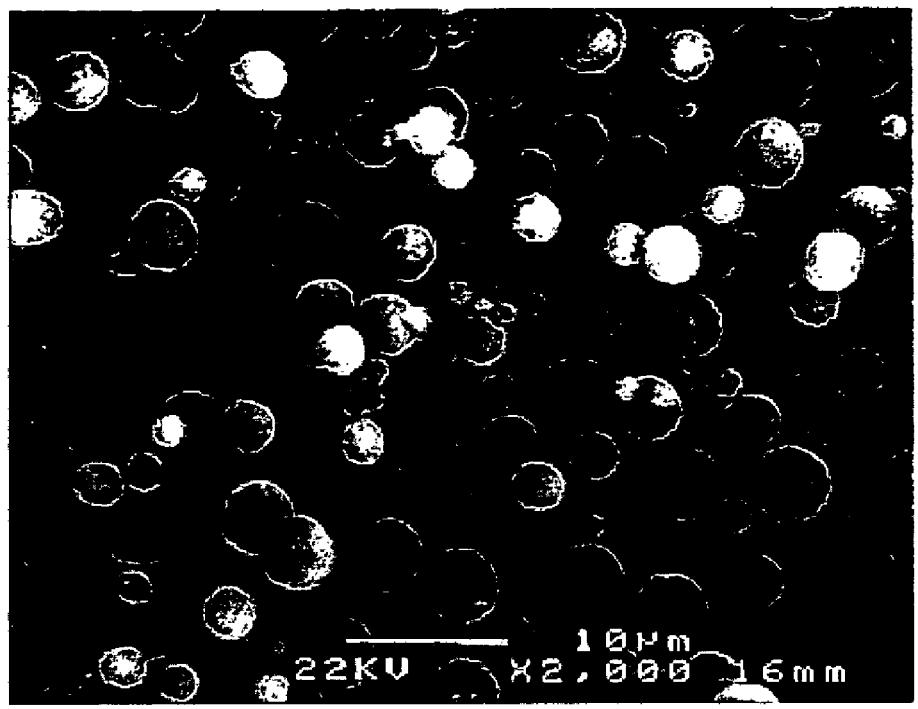
FIGS. 3A and 3B are SEM images (3A: ×2,000; 3B: ×4,000) of $(Ni_{1/3}Co_{1/3}Mn_{1/3})CO_3$, prepared from a solution of 0.2 M of $NiSO_4$, 0.2 M $CoSO_4$, 0.2 M $MnSO_4$, and 1 M of $NaHCO_3$, using $(NH_4)_2SO_4$ (0.067 M) as a chelating agent at a temperature of 50° C. over 17 h.
Figure 3B:
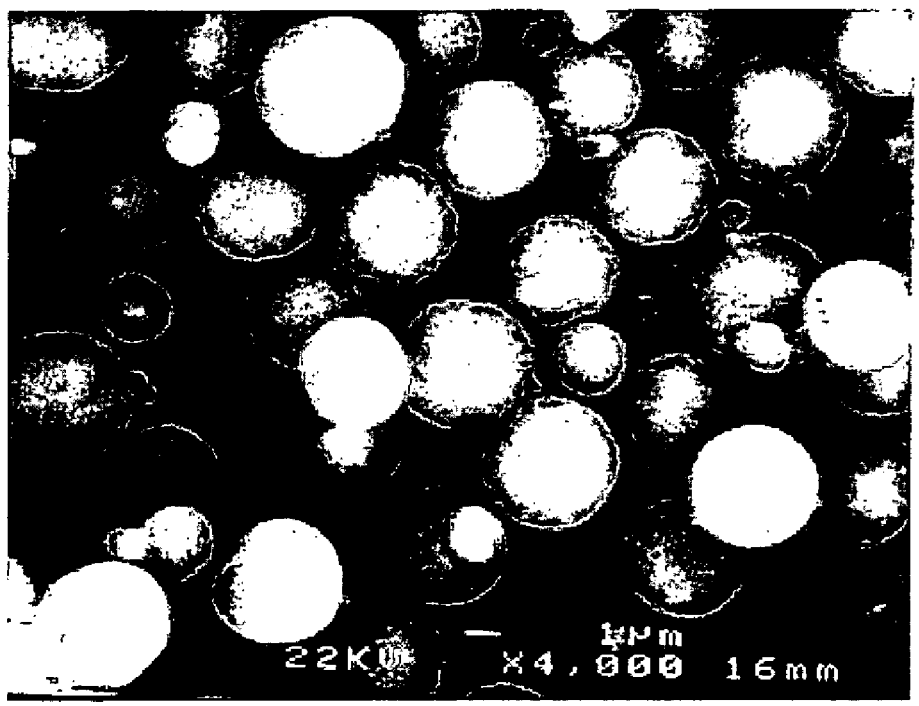

A sample of ($Ni_{1/3}Co_{1/3}Mn_{1/3}$)$CO_3$ was prepared from a solution of 0.2 M of $NiSO_4$, 0.2 M $CoSO_4$, 0.2 M $MnSO_4$, and 1 M of $NaHCO_3$. ($NH_4$)$_2SO_4$ (0.067 M) was used as a chelating agent, and the pH was adjust to 7-8 using $NH_4OH$. The reaction was carried out at 50° C. and 17 h. FIGS. 3A and 3B show SEM images of ($Ni_{1/3}Co_{1/3}Mn_{1/3}$)$CO_3$ at different magnifications. The chemical composition of the carbonate was confirmed by elemental analysis. The use of $NaHCO_3$ resulted in the preparation of a dense carbonate powder with spherical morphology and an average particle size of 2-4 μm.

Example 3

Figure 4:
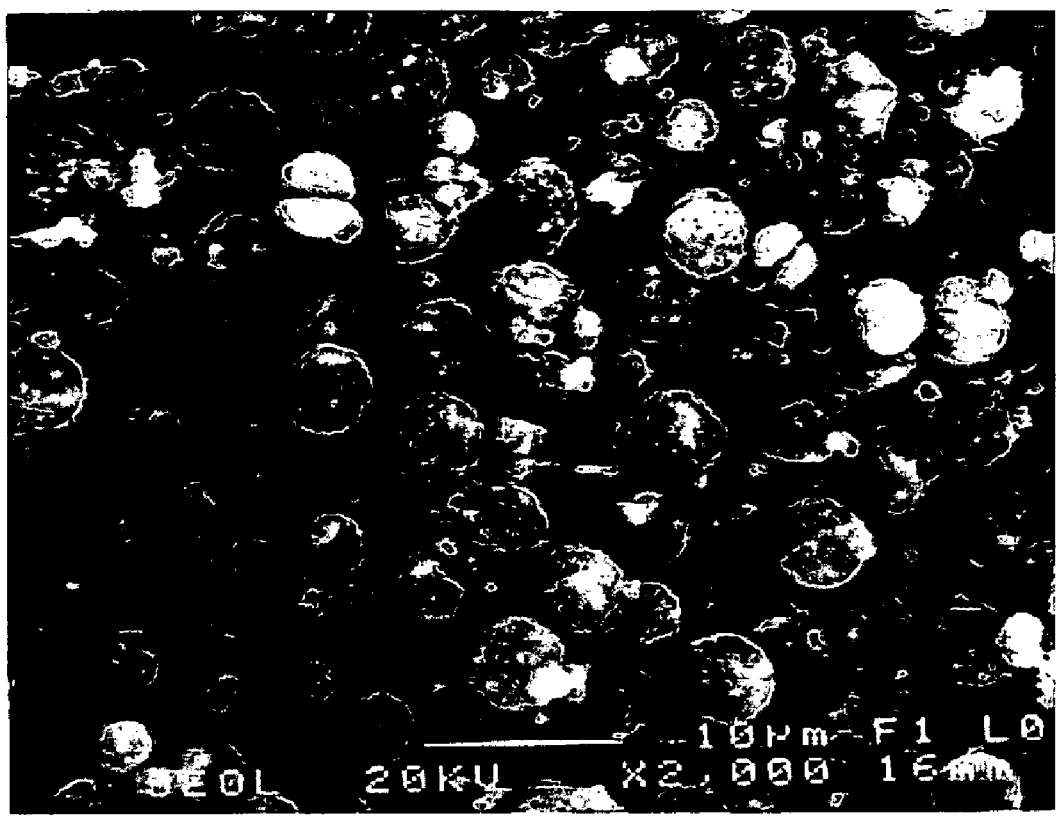
FIG. 4 is an SEM image (×2,000) of $(Ni_{1/3}Co_{1/3}Mn_{1/3})CO_3$, prepared from a solution of 0.2 M of $NiSO_4$, 0.2 M $CoSO_4$, 0.2 M $MnSO_4$, and a mixture of 0.9 M $NaHCO_3$ and 0.1 M $NH_4HCO_3$, at a temperature of 50° C. over 24 h.

A different sample of ($Ni_{1/3}Co_{1/3}Mn_{1/3}$)$CO_3$ was prepared from a solution of 0.1 M each of Ni(OCOCH$_3$)$_2$, Co(NO$_3$)$_2$, Mn(OCOCH$_3$)$_2$, and a mixture of 0.9M $NaHCO_3$ and 0.1M $NH_4HCO_3$ at 50° C. and over 24 h. FIG. 4 is an SEM image of the different sample of ($Ni_{1/3}Co_{1/3}Mn_{1/3}$)$CO_3$. The use of a mixture of $NaHCO_3$ and $NH_4HCO_3$ resulted in the preparation of a dense carbonate powder with spherical morphology and an average particle size of 2-5 μm.

Example 4

Figure 5A:
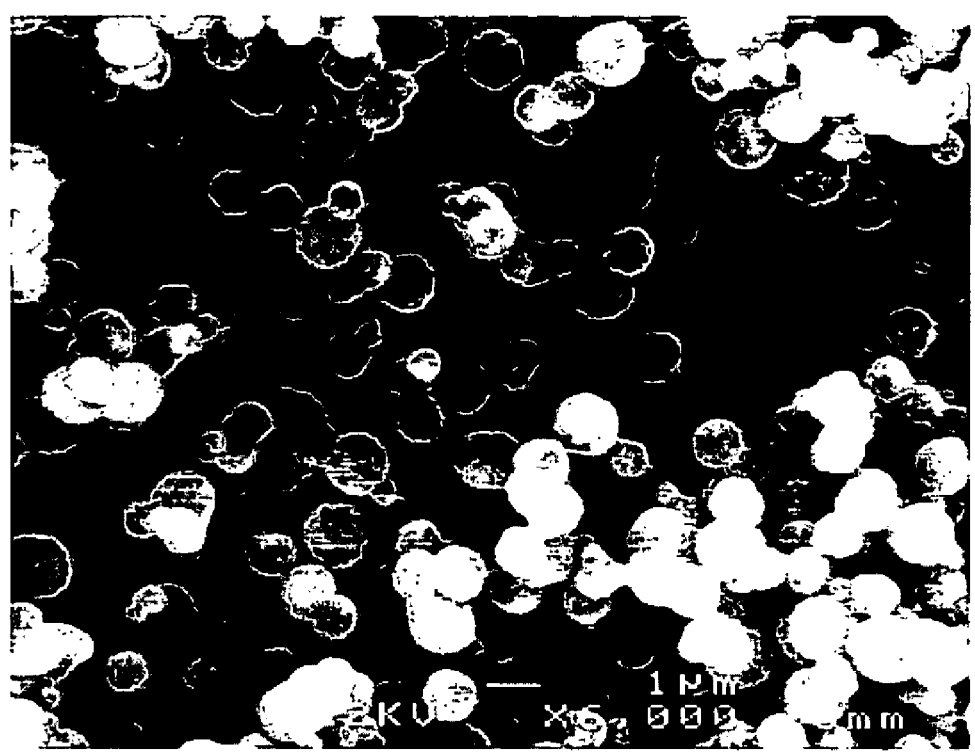
FIG. 5A is an SEM image (×6,000) of $MnCO_3$, prepared from 0.1 M $MnSO_4$ and 1 M $NH_4HCO_3$, using urea (0.1 M) as a chelating agent at a temperature of 25° C. over 5 h.
Figure 5B:
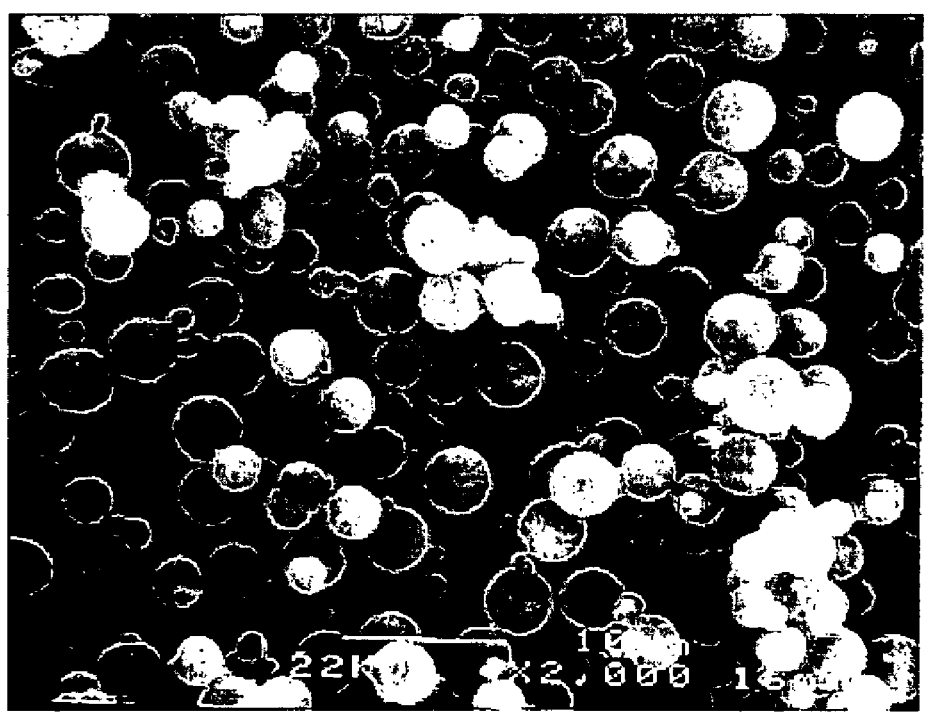
FIGS. 5B and 5C are SEM images (5B: ×2,000; 5C: ×4,000) of $(Ni_{0.187}Co_{0.125}Mn_{0.688})CO_3$, prepared from a solution of 0.2 M $Ni(OCOCH_3)_2$, 0.2 M $Co(NO_3)_3$, 0.2 M $Mn(OCOCH_3)_2$, and 1 M of $NaHCO_3$, using $(NH_4)_2SO_4$ (0.067 M) as a chelating agent, at a temperature of 50° C. over 17 h.
Figure 5C:
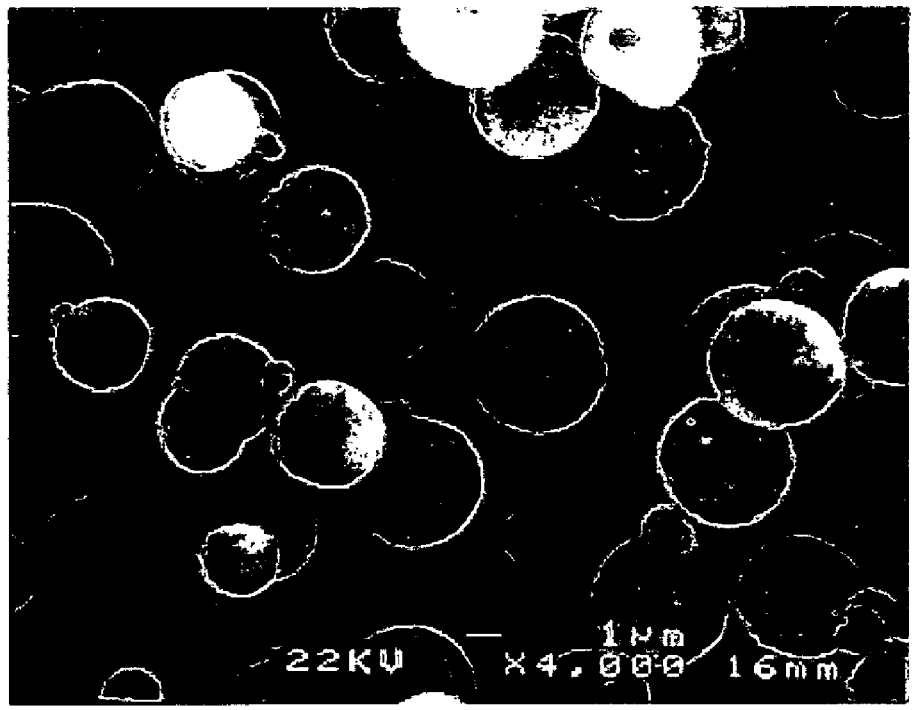
Figure 5D:
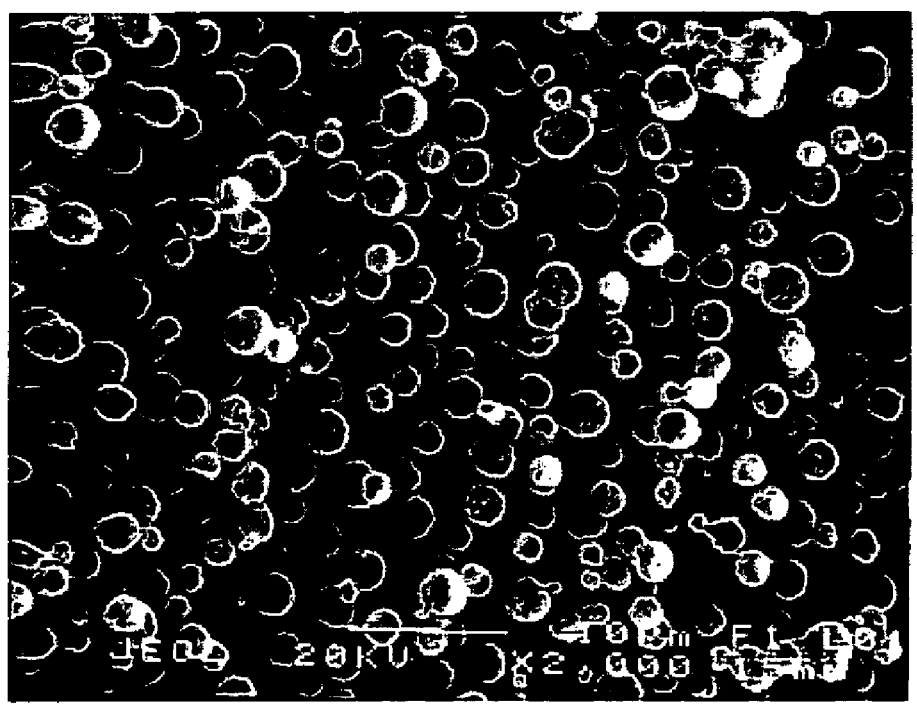
FIGS. 5D and 5E are SEM images (5D: ×2,000; 5E: ×5,000) of $(Ni_{0.25}Mn_{0.75})CO_3$, prepared from a solution of 0.2 M of $NiSO_4$, 0.2 M $MnSO_4$, and 1 M of $NaHCO_3$, using $(NH_4)_2SO_4$ (0.067 M) as a chelating agent at a temperature of 50° C. over 24 h.
Figure 5E:
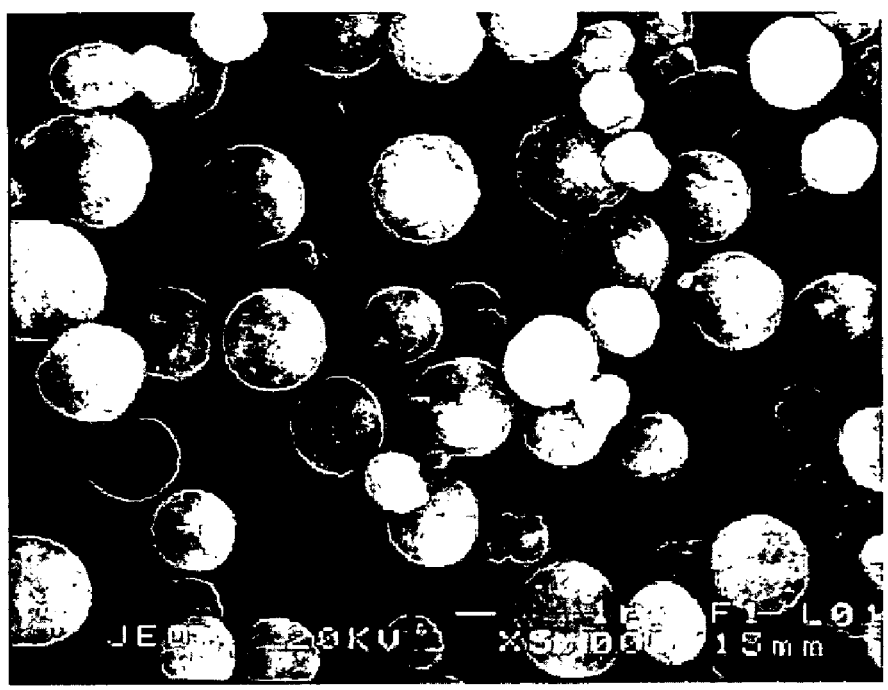
Figure 5F:
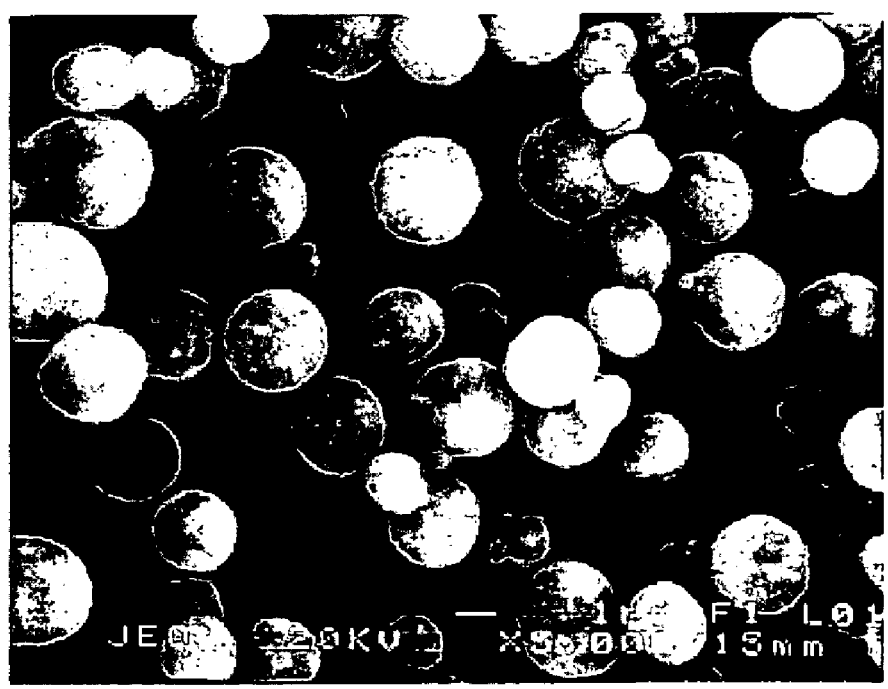
FIG. 5F is an SEM image (×5,000) of $(Ni_{0.219}Co_{0.125}Mn_{0.656})CO_3$, prepared from a solution of 0.2 M of $NiSO_4$, 0.2 M $CoSO_4$, 0.2 M $MnSO_4$, and 1 M of $NaHCO_3$, at a temperature of 50° C. over 24 h.

Similarly, FIGS. 5A-5E show SEM images of co-precipitated metal carbonates with various cationic compositions. All of the prepared metal carbonates showed spherical morphology with uniform size distribution. $MnCO_3$, as depicted in FIG. 5A, was prepared from 0.1 M $MnSO_4$ and 1 M $NH_4HCO_3$, with urea (0.1 M) as a chelating agent, at 25° C., and over 5 h. ($Ni_{0.187}Co_{0.125}Mn_{0.688}$)$CO_3$, as depicted in FIGS. 5B and 5C, was prepared from a solution of 0.2 M Ni(OCOCH$_3$)$_2$, 0.2 M Co(NO$_3$)$_3$, 0.2 M Mn(OCOCH$_3$)$_2$, and 1 M of $NaHCO_3$, with ($NH_4$)$_2SO_4$ (0.067 M) as a chelating agent at 50° C., and over 17 h. ($Ni_{0.25}Mn_{0.75}$)$CO_3$, as depicted in FIGS. 5D and 5E, was prepared from a solution of 0.2 M of $NiSO_4$, 0.2 M $MnSO_4$, and 1 M of $NaHCO_3$, with ($NH_4$)$_2SO_4$ (0.067 M) as a chelating agent at 50° C., and over 24 h. ($Ni_{0.219}Co_{0.125}Mn_{0.656}$)$CO_3$, as depicted in FIG. 5F, was prepared from a solution of 0.2 M of $NiSO_4$, 0.2 M $CoSO_4$, 0.2 M $MnSO_4$, and 1 M of $NaHCO_3$ at 50° C., and over 24 h.

Figure 6:
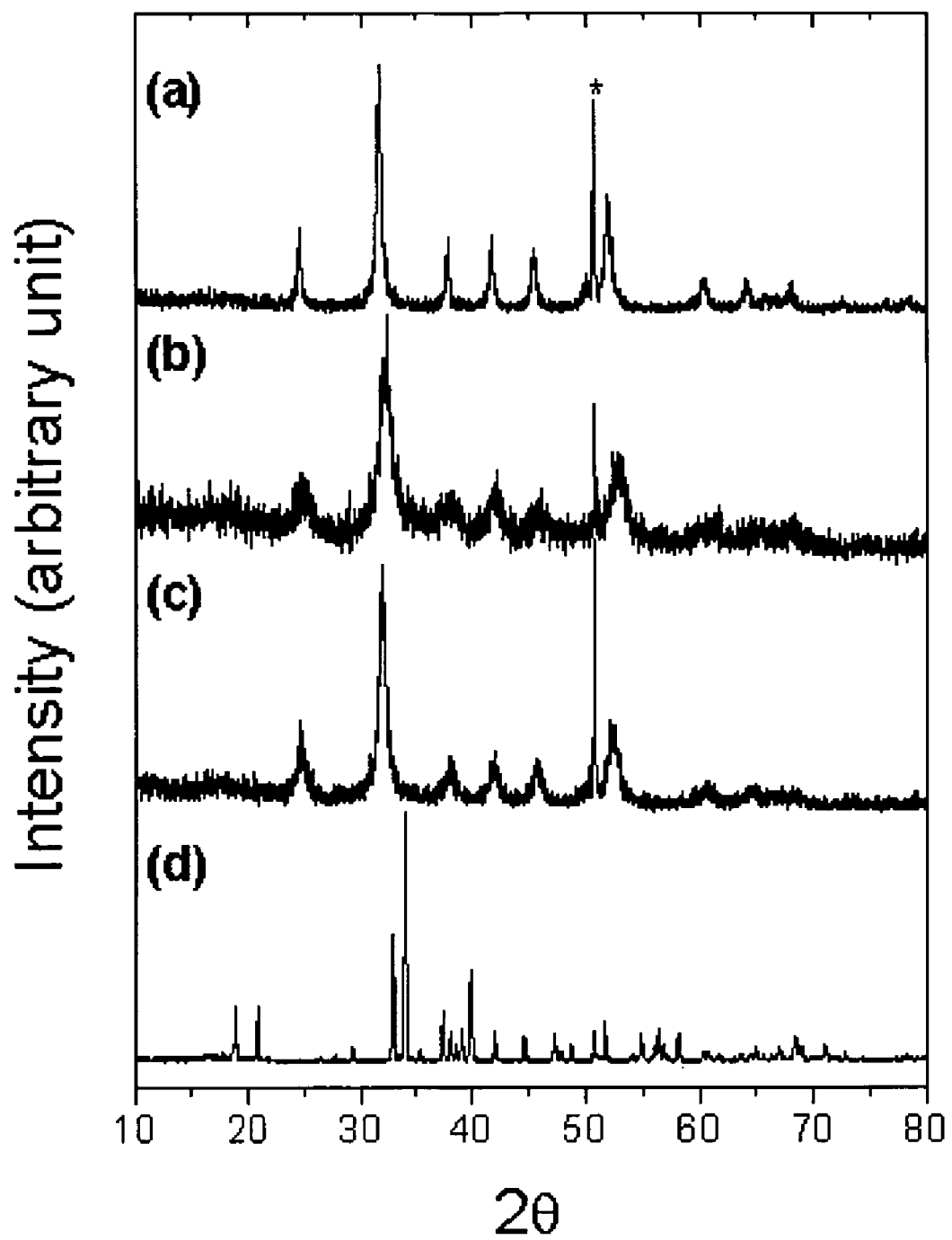
FIG. 6 is a compilation of X-Ray Diffraction (XRD) patterns of co-precipitated metal carbonates: (a) $MnCO_3$, (b) $(Ni_{1/3}Co_{1/3}Mn_{1/3})CO_3$, (c) $(Ni_{0.187}Co_{0.125}Mn_{0.688})CO_3$, and (d) $Ag_2CO_3$. The diffraction peak marked with an asterisk (*) is from the X-ray sample holder.

FIG. 6 is a compilation of XRD patterns of various metal carbonates prepared by the disclosed co-precipitation methods. The diffraction patterns of $MnCO_3$, ($Ni_{1/3}Co_{1/3}Mn_{1/3}$)$CO_3$, and ($Ni_{0.187}Co_{0.125}Mn_{0.688}$)$CO_3$ agree well with those of rhombohedral $MnCO_3$ and $CoCO_3$ with a space group of R$\bar{3}$c. The diffraction pattern of $Ag_2CO_3$ is in good agreement with that of monoclinic silver carbonate with space group of P2$_1$/m, as found in the powder XRD database from the Joint Committee for Powder Diffraction Studies (JCPDS 70-2184). These patterns demonstrate that pure, single-phase metal carbonates are produced by the methods described herein.

Example 5

FIGS. 7A-G show SEM images of various lithium metal oxides prepared from the co-precipitated carbonate precursors of Examples 2, 3, and 4. To prepare $LiMn_2O_4$ and $Li_{1.04}Mn_{1.90}Al_{0.06}O_4$ (FIGS. 7A and 7B, respectively), appropriate amounts of $Li_2CO_3$, $MnCO_3$, and $Al_2O_3$ were mixed and calcined at 700° C. for 10 h in air. $LiNi_{1/3}Co_{1/3}Mn_{1/3}O_2$; $Li_{1.2}Ni_{0.2}Mn_{0.6}O_2$; $LiNi_{0.25}Mn_{0.75}O_{1.75}$; $Li_{1.2}Ni_{0.175}Co_{0.10}Mn_{0.525}O_{1.95}F_{0.05}$, and $LiNi_{0.5}Mn_{1.5}O_4$ (the SEM images of which are shown in FIGS. 7C-7G), were prepared from appropriate amounts of $Li_2CO_3$, (Ni,Co,Mn)$CO_3$, and in the one instance $NH_4F$, which were mixed and calcined at 800-1,000° C. for 10-24 h in air. The SEM images depicted in FIGS. 7A-7G show that the lithiated materials retain the spherical shape and particle size of the metal carbonate precursors.

Figure 7A:
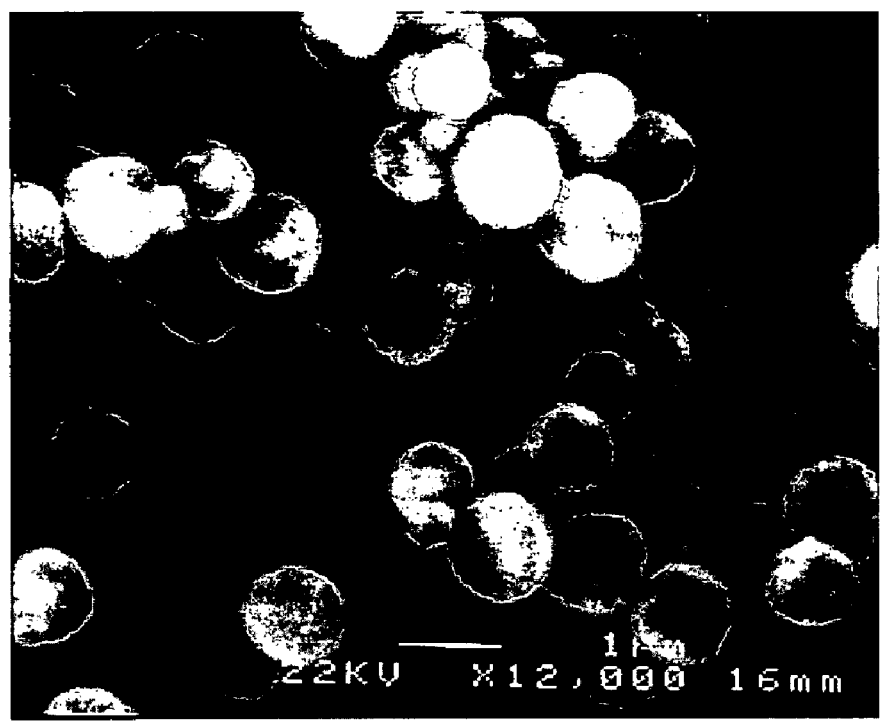
FIG. 7A is an SEM image (×12,000) of $LiMn_2O_4$, prepared by mixing $Li_2CO_3$ and $MnCO_3$ followed by calcining at 700° C. for 10 h in air.
Figure 7B:
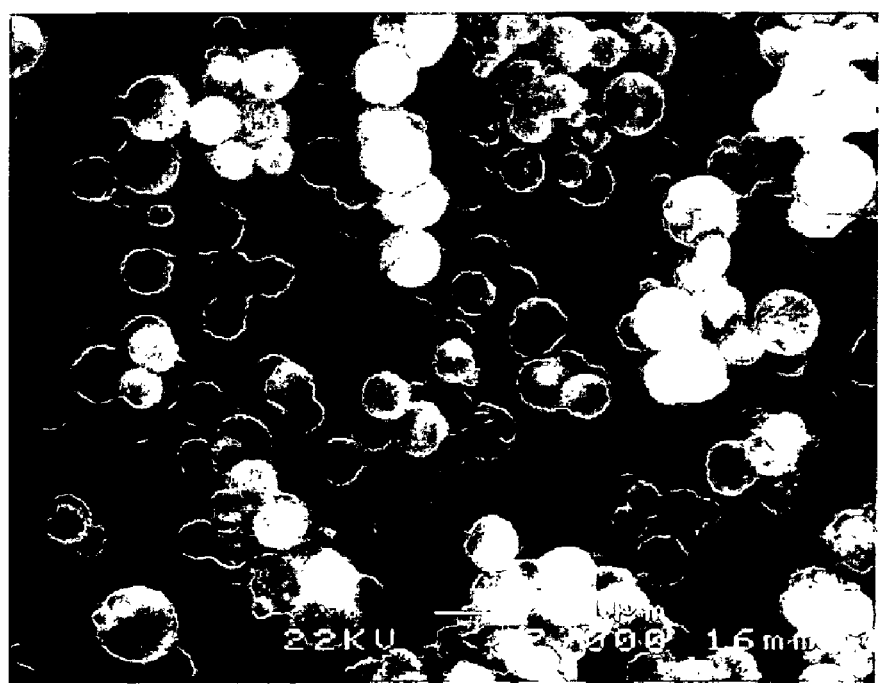
FIG. 7B is an SEM image (×7000) of $Li_{1.04}Mn_{1.90}Al_{0.06}O_4$, prepared by mixing $Li_2CO_3$, $Al_2O_3$, and $MnCO_3$ followed by calcining the mixture at 700° C. for 10 h in air.
Figure 7C:
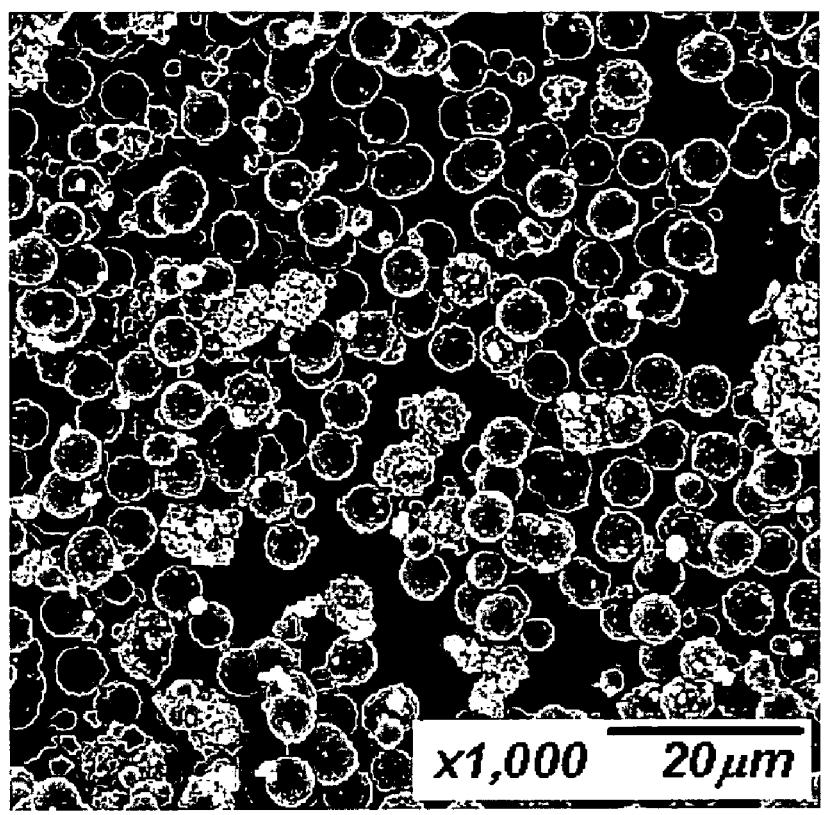
FIG. 7C is an SEM image (×1000) of $LiNi_{1/3}Co_{1/3}Mn_{1/3}O_2$, prepared by mixing $Li_2CO_3$ and $(Ni_{1/3}Co_{1/3}Mn_{1/3})CO_3$ followed by calcining the mixture at 1000° C. for 10 h in air.
Figure 7D:
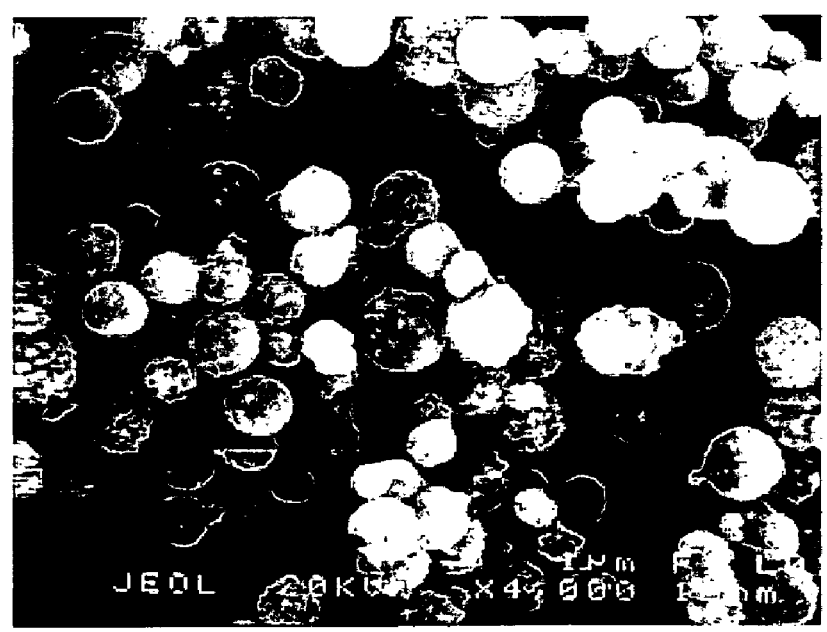
FIG. 7D is an SEM image (×4000) of $Li_{1.2}Ni_{0.2}Mn_{0.6}O_2$, prepared by mixing $Li_2CO_3$ and $(Ni_{1/4}Mn_{3/4})CO_3$ followed by calcining the mixture at 800° C. for 10 h in air.
Figure 7E:
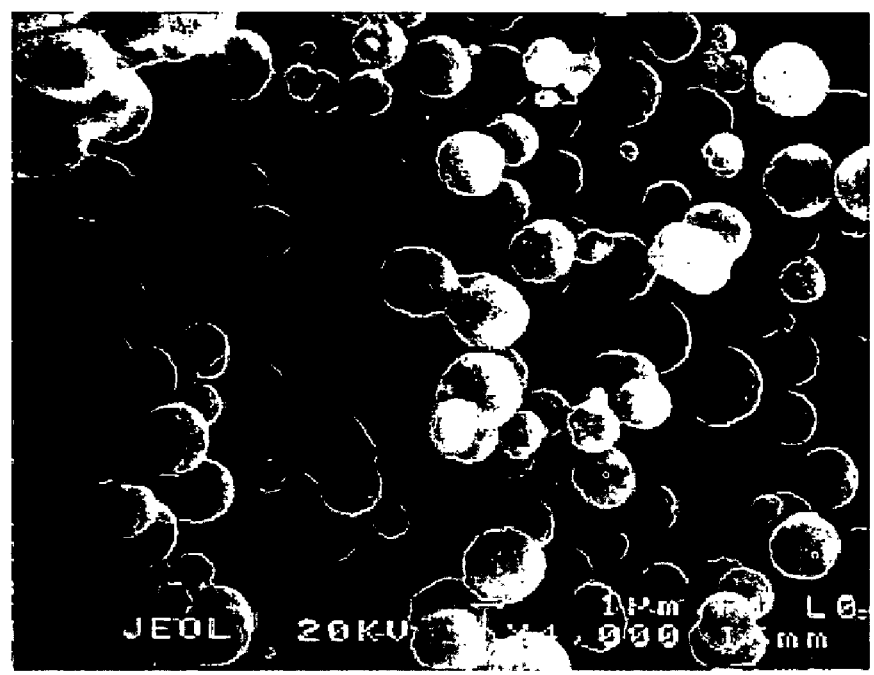
FIG. 7E is an SEM image (×4000) of $LiNi_{0.25}Mn_{0.75}O_{1.75}$, prepared by mixing $Li_2CO_3$ and $(Ni_{1/4}Mn_{3/4})CO_3$ followed by calcining the mixture at 900° C. for 10 h in air.
Figure 7F:
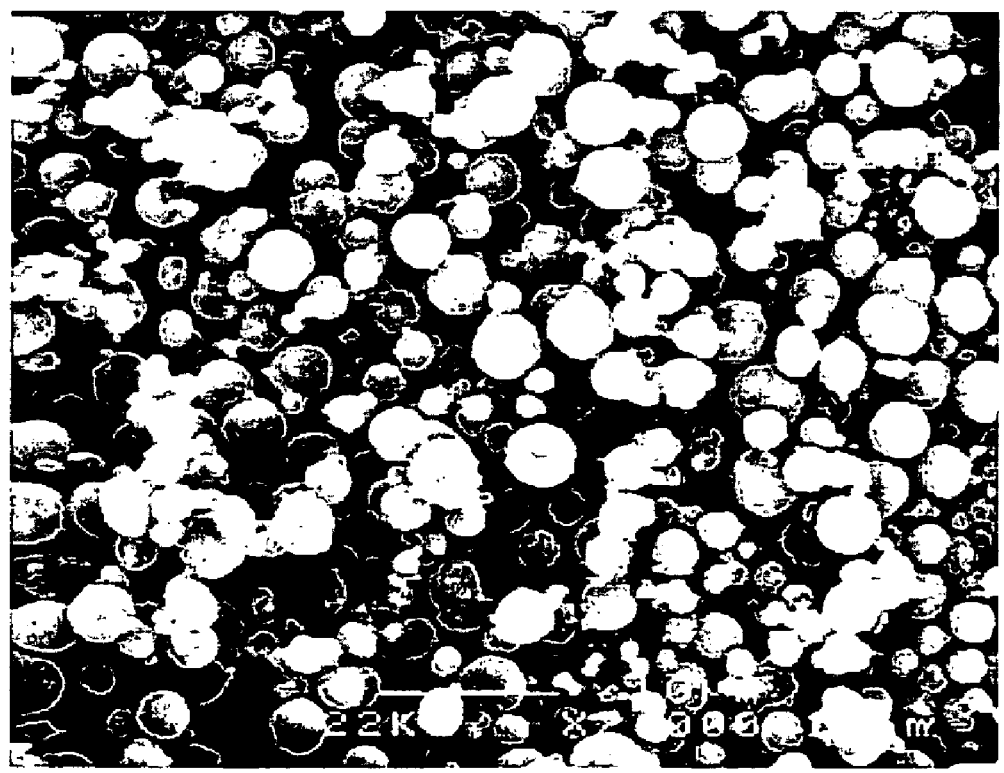
FIG. 7F is an SEM image (×2,000) of $Li_{1.2}Ni_{0.175}Co_{0.10}Mn_{0.525}O_{1.95}F_{0.05}$, prepared by mixing $Li_2CO_3$, $(Ni_{0.219}Co_{0.125}Mn_{0.656})CO_3$, and $NH_4F$, followed by calcining the mixture at 900° C. for 10 h in air.
Figure 7G:
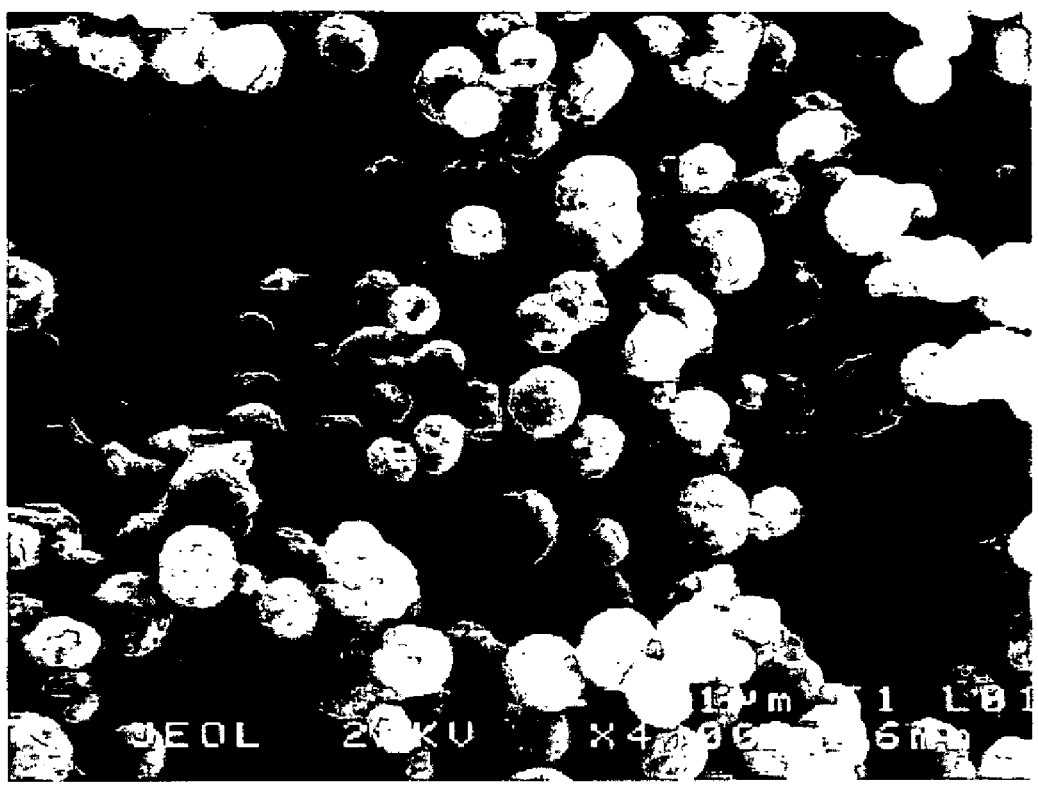
FIG. 7G is an SEM image (×4,000) of $LiNi_{0.5}Mn_{1.5}O_4$, prepared by mixing $Li_2CO_3$ and $(Ni_{1/4}Mn_{3/4})CO_3$ followed by calcining the mixture at 900° C. for 10 h in air.
Figure 8:
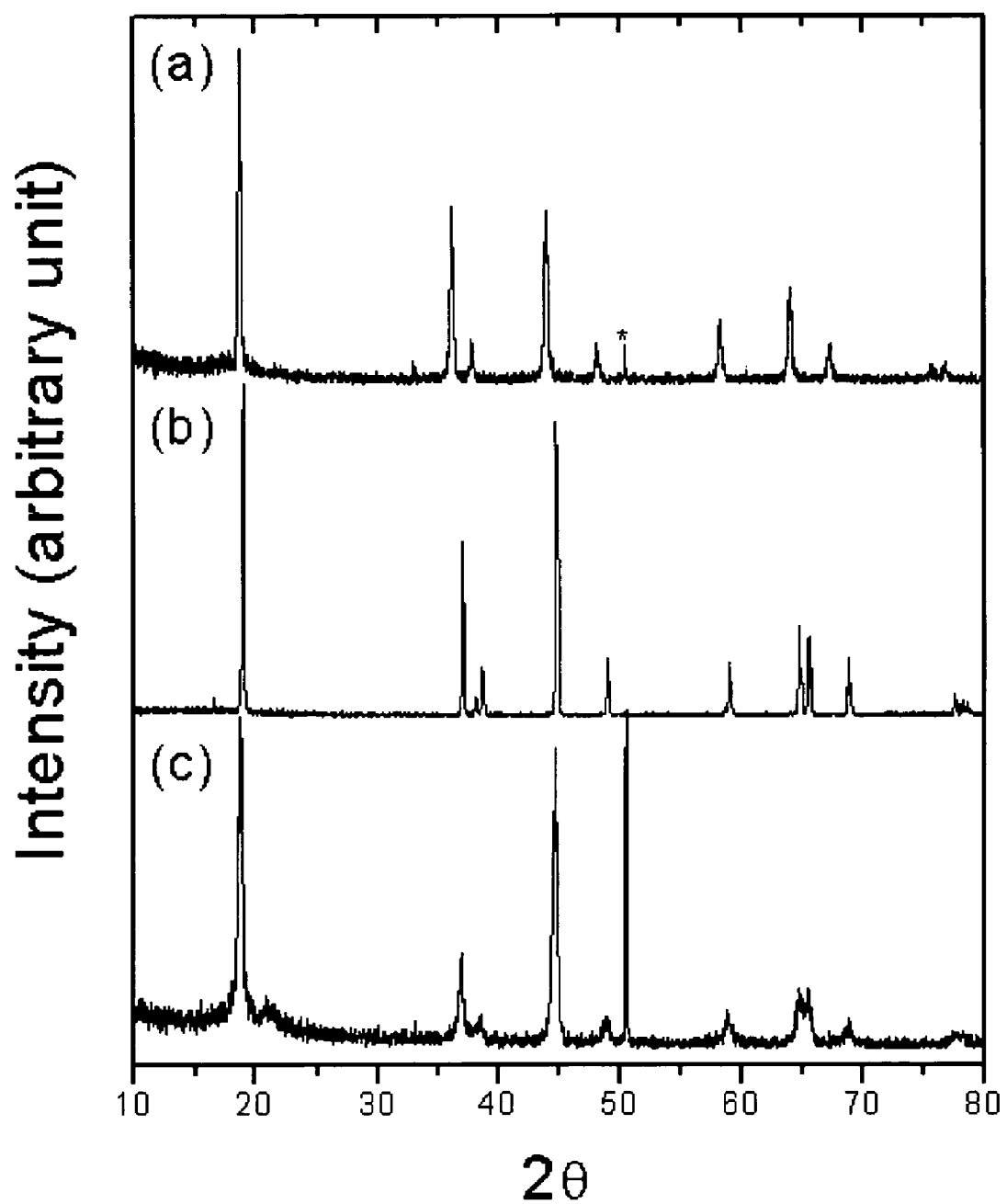
FIG. 8 is a compilation of XRD patterns of lithium metal oxides shown in FIGS. 7B, 7C, and 7F: (a) $Li_{1.04}Mn_{1.90}Al_{0.06}O_4$; (b) $LiNi_{1/3}Co_{1/3}Mn_{1/3}O_2$; and (c) $Li_{1.2}Ni_{0.175}Co_{0.10}Mn_{0.525}O_{1.95}F_{0.05}$. The diffraction peak marked with an asterisk (*) is from the X-ray sample holder.

FIG. 8 shows the XRD patterns of various lithium metal oxides as prepared above, the SEM images of which are depicted in FIGS. 7B, 7C, and 7F. The XRD pattern of $Li_{1.04}Mn_{1.90}Al_{0.06}O_4$ shows a cubic spinel structure (space group of Fd$\bar{3}$m); the XRD pattern of $LiNi_{1/3}Co_{1/3}Mn_{1/3}O_2$ shows a α-NaFeO$_2$ structure (space group of R$\bar{3}$m); the XRD pattern of Li$_{1.2}$Ni$_{0.175}$Co$_{0.10}$Mn$_{0.525}$O$_{1.95}$F$_{0.05}$ shows an α-NaFeO$_2$ structure with additional small peaks at approximately 22° corresponding to Li—Mn ordering. These images demonstrate that pure, single-phase lithium metal oxides have been synthesized using the co-precipitated mixed-metal precursors produced by methods as disclosed herein.

Example 6

The lithium metal oxide cathode materials from Example 5 were tested in electrochemical cells comprising a positive electrode, a negative electrode, and a non-aqueous electrolyte. The positive electrode consisted of 84 wt % lithium metal oxide powder, 8 wt % carbon, and 8 wt % PVDF binder on aluminum foil. The negative electrode was either metallic lithium or graphite on copper foil. The non-aqueous electrolyte was 1 M LiPF$_6$ in a 1:1 mixture of EC and DEC. LiNi$_{1/3}$Co$_{1/3}$Mn$_{1/3}$O$_2$ was galvanostatically cycled versus Li$^0$ at 2.8-4.3V and delivered a stable discharge capacity of from about 160 to about 180 mAh/g. Li$_{1.2}$Ni$_{0.175}$Co$_{0.10}$Mn$_{0.525}$O$_{1.95}$F$_{0.05}$ was galvanostatically cycled versus Li$^0$ at 2.8-4.6V and delivered a stable discharge capacity of from about 220 to about 240 mAh/g.

While some embodiments have been illustrated and described, it should be understood that changes and modifications can be made therein in accordance with ordinary skill in the art without departing from the invention in its broader aspects as defined in the following claims.

What is claimed is:

1. A method comprising:
    precipitating spherical particles comprising one or more metal carbonates or one or more metal phosphates from a combined aqueous solution comprising a precipitating agent, wherein:
    the precipitating agent is selected from ammonium hydrogen carbonate, sodium hydrogen carbonate, or a mixture comprising sodium hydrogen carbonate when the spherical particles are the one or more metal carbonates and the metal carbonates are selected from the group consisting of (Ni$_\alpha$Co$_\beta$Mn$_\gamma$Me'$_\delta$)CO$_3$, wherein Me' is selected from the group consisting of Fe, Ag, Cu, Zn, or Mg; $0<\alpha\leq1$, $0<\beta\leq1$, $0<\gamma\leq1$, and $0\leq\delta\leq1$; and the sum of α, β, γ, and δ is 1; or
    the precipitating agent is ammonium hydrogen phosphate, ammonium dihydrogen phosphate, sodium phosphate, sodium hydrogen phosphate, sodium dihydrogen phosphate, or a mixture comprising any two or more thereof when the spherical particles are the one or more metal phosphates wherein the metal phosphates are selected from the group consisting of (Ni$_{\alpha'}$Co$_{\beta'}$Mn$_{\gamma'}$Fe$_\delta$)(PO$_4$); wherein $0\leq\alpha'\leq1$, $0\leq\beta'\leq1$, $0\leq\gamma'\leq1$, and $0\leq\delta\leq1$; and where the sum of α', β', γ', and δ is 1.

2. The method of claim 1, wherein the spherical particles are calcined from about 100° C. to about 1000° C.

3. The method of claim 1, wherein the spherical particles have a diameter of from about 0.1 μm to about 100 μm and a tap density from about 1.5 g/cm$^3$ to about 3 g/cm$^3$.

4. The method of claim 1, further comprising:
    forming the combined aqueous solution by adding an aqueous solution of one or more metal salts to an aqueous solution comprising the precipitating agent.

5. The method of claim 4, wherein the one or more metal salts are selected from metal sulfates, metal acetates, metal nitrates, metal chlorides, or a mixture of any two or more thereof.

6. The method of claim 4, wherein when the spherical particles are the metal phosphates, the method further comprises purging the combined solution with nitrogen, argon, carbon dioxide, or oxygen gas during the precipitating step.

7. The method of claim 4, wherein a concentration of metal ions in the aqueous solution of one or more metal salts is from about 0.01 M to about 5 M.

8. The method of claim 4, wherein a pH of the aqueous solution of one or more metal salts is from about 4 to about 8.

9. The method of claim 4, wherein a concentration of precipitating agent is from 0.1 M to 5 M.

10. The method of claim 1, wherein the mixture comprising sodium hydrogen carbonate, further comprises ammonium carbonate, sodium carbonate, or both ammonium carbonate and sodium carbonate.

11. The method of claim 1, wherein the precipitating step is carried out in the presence of a chelating agent.

12. The method of claim 11, wherein the chelating agent is selected from the group consisting of ammonium sulfate, ammonium hydroxide, ammonium chloride, ammonium acetate, ammonium nitrate, urea, or a mixture of any two or more thereof.

13. The method of claim 11, wherein a total concentration of chelating agent is from about 0.005 M to about 2 M.

14. The method of claim 1, further comprising calcining a mixture comprising the spherical particles and a lithium salt to provide spherical lithium particles selected from spherical lithium metal oxides and spherical lithium metal phosphates.

15. The method of claim 14, wherein the lithium salt is selected from lithium carbonate, lithium hydroxide, lithium nitrate, lithium acetate, or a mixture of any two or more thereof.

16. The method of claim 14, wherein the mixture further comprises a metal cation dopant selected from the group consisting of Mg, Zn, Al, Ga, B, Zr, Si, Ti, Nb, and W.

17. The method of claim 14, wherein the mixture further comprises an anion dopant selected from the group consisting of F, S, Cl, Br, and I.

18. The method of claim 14, wherein the mixture is calcined in an inert atmosphere or in the presence of oxygen and the calcining is performed from about 450° C. to about 1100° C.

19. The method of claim 14, wherein the spherical lithium metal oxide comprises Li$_{1+x}$Ni$_\alpha$Co$_\beta$Mn$_\gamma$Me$_y$O$_{2-z}$X$_z$ wherein Me is selected from the group consisting of Mg, Zn, Al, Ga, B, Zr, Si, Ti, Nb, and W; X selected from the group consisting of F, S, Cl, and I; $0\leq x\leq0.33$; $0<\alpha\leq1$, $0<\beta\leq1$, $0<\gamma\leq1$, $0\leq y\leq0.2$, and $0\leq z\leq0.3$; and where the sum of x, α, β, γ, and y is equal to 1.

20. The method of claim 14, wherein the spherical lithium metal oxide comprises Li$_{1+x}$Ni$_a$Co$_b$Mn$_c$Me$_y$O$_{4-z}$X$_z$ wherein Me is selected from the group consisting of Mg, Zn, Al, Ga, B, Zr, Si, Ti, Nb, and W; X selected from the group consisting of F, S, Cl, and I; $0\leq x\leq0.33$; $0<a\leq2$, $0<b\leq2$, $0<c\leq2$, $0\leq y\leq0.2$, and $0\leq z\leq0.3$; and where the sum of x, a, b, c, and y is equal to 2.

21. The method of claim 14, wherein the spherical lithium metal phosphate comprises Li$_{1+x'}$(Ni$_\alpha$Co$_{\beta'}$Mn$_{\gamma'}$Fe$_\delta$)$_{1-y'}$Me''$_{y'}$PO$_4$ wherein Me'' is selected from the group consisting of Al, Zr, Si, Ti, Nb, Mo and W; $0\leq x'\leq0.1$; $0\leq\alpha'\leq1$, $0\leq\beta'\leq1$, $0\leq\gamma'\leq1$, and $0\leq y'\leq0.1$.

22. A composition prepared by the method of claim 14.

* * * * *